(12) United States Patent
Kammerer et al.

(10) Patent No.: US 9,910,815 B2
(45) Date of Patent: Mar. 6, 2018

(54) IO-LINK ADAPTER

(71) Applicant: Balluff GmbH, Neuhausen a.d.F. (DE)

(72) Inventors: Andreas Kammerer, Winnenden (DE); Marco Zorcic, Leinfelden-Echterdingen (DE)

(73) Assignee: Balluff GmbH, Neuhausen a.d.F. (DE)

( * ) Notice: Subject to any disclaimer, the term of this patent is extended or adjusted under 35 U.S.C. 154(b) by 182 days.

(21) Appl. No.: 14/960,743

(22) Filed: Dec. 7, 2015

(65) Prior Publication Data

US 2016/0162433 A1 Jun. 9, 2016

(30) Foreign Application Priority Data

Dec. 8, 2014 (DE) ........................ 10 2014 118 172

(51) Int. Cl.
| | |
|---|---|
| *G06F 13/00* | (2006.01) |
| *G06F 13/20* | (2006.01) |
| *G06F 13/42* | (2006.01) |
| *G08C 23/04* | (2006.01) |
| *H04Q 9/00* | (2006.01) |
| *H04L 12/64* | (2006.01) |

(Continued)

(52) U.S. Cl.
CPC ........... *G06F 13/426* (2013.01); *G01D 21/00* (2013.01); *G06F 1/266* (2013.01); *G06F 1/3215* (2013.01); *G06F 1/3287* (2013.01); *G06F 13/4022* (2013.01); *G06F 13/4068* (2013.01); *G08C 23/04* (2013.01); *H04L 12/6418* (2013.01); *H04L 67/145* (2013.01); *H04Q 9/00* (2013.01)

(58) Field of Classification Search
None
See application file for complete search history.

(56) References Cited

U.S. PATENT DOCUMENTS 5,185,736 A * 2/1993 Tyrrell ...................... H04J 3/08
370/358
5,293,216 A * 3/1994 Moslehi ............ G01B 11/0616
219/121.6

(Continued)

FOREIGN PATENT DOCUMENTS

| | | | |
|---|---|---|---|
| AT | 505 607 B1 | 11/2010 | |
| DE | 10 2009 013 303 A1 | 9/2010 | |

(Continued)

OTHER PUBLICATIONS

German Office Action dated Feb. 24, 2015 in German Application No. 10 2014 118 172.7 with English translation of relevant parts.

(Continued)

*Primary Examiner* — Michael Sun
(74) *Attorney, Agent, or Firm* — Collard & Roe, P.C.

(57) ABSTRACT

An IO-Link adapter (200) for connecting a field device to a master unit having an IO-Link interface (210), a field device interface (220) and a circuit arrangement (230) for converting the field device interface data into IO-Link interface data is characterized in that the IO-Link adapter (200) has fastening elements (240) for detachably fastening to the field device, wherein by fastening the IO-Link adapter (200) to the field device, coupling of the field device interface (220) of the IO-Link adapter (200) to an interface of the field device (120) simultaneously takes place.

9 Claims, 1 Drawing Sheet

(51) Int. Cl.
*H04L 29/08* (2006.01)
*G01D 21/00* (2006.01)
*G06F 1/26* (2006.01)
*G06F 1/32* (2006.01)
*G06F 13/40* (2006.01)

(56) References Cited

U.S. PATENT DOCUMENTS

| | | | |
|---|---|---|---|
| 5,870,382 A * | 2/1999 | Tounai | H04L 12/5601 340/2.8 |
| 7,843,697 B2 * | 11/2010 | McCoy | F25D 23/12 361/728 |
| 2008/0244104 A1 * | 10/2008 | Clemente | H04L 12/40013 710/11 |
| 2008/0247141 A1 * | 10/2008 | Kendall | F25D 23/028 361/729 |
| 2008/0294915 A1 * | 11/2008 | Juillerat | G06F 1/266 713/300 |
| 2009/0046981 A1 * | 2/2009 | Margolin | G02B 6/3825 385/70 |
| 2010/0259101 A1 * | 10/2010 | Micallef | G01D 21/00 307/26 |
| 2011/0146329 A1 * | 6/2011 | Kuehl | F25D 29/00 62/389 |
| 2015/0143009 A1 * | 5/2015 | Feinaeugle | G05B 19/0425 710/110 |

FOREIGN PATENT DOCUMENTS

| | | |
|---|---|---|
| DE | 20 2009 010 293 U1 | 9/2010 |
| DE | 10 2012 014 681 A1 | 12/2013 |

OTHER PUBLICATIONS

International Standard IEC 61131-9, Edition 1.0, Sep. 2013, Balluff GmbH, 576 pages.

Näther, I., "Adapter, Integriert Standardsensoren in IO-Link", p. 1-2, Nov. 18, 2009, URL=http://www.elektrotechnik.vogel.de/feldkommunikation/articles/239154/[recherchiert am Feb. 20, 2015], with translated press release.

* cited by examiner

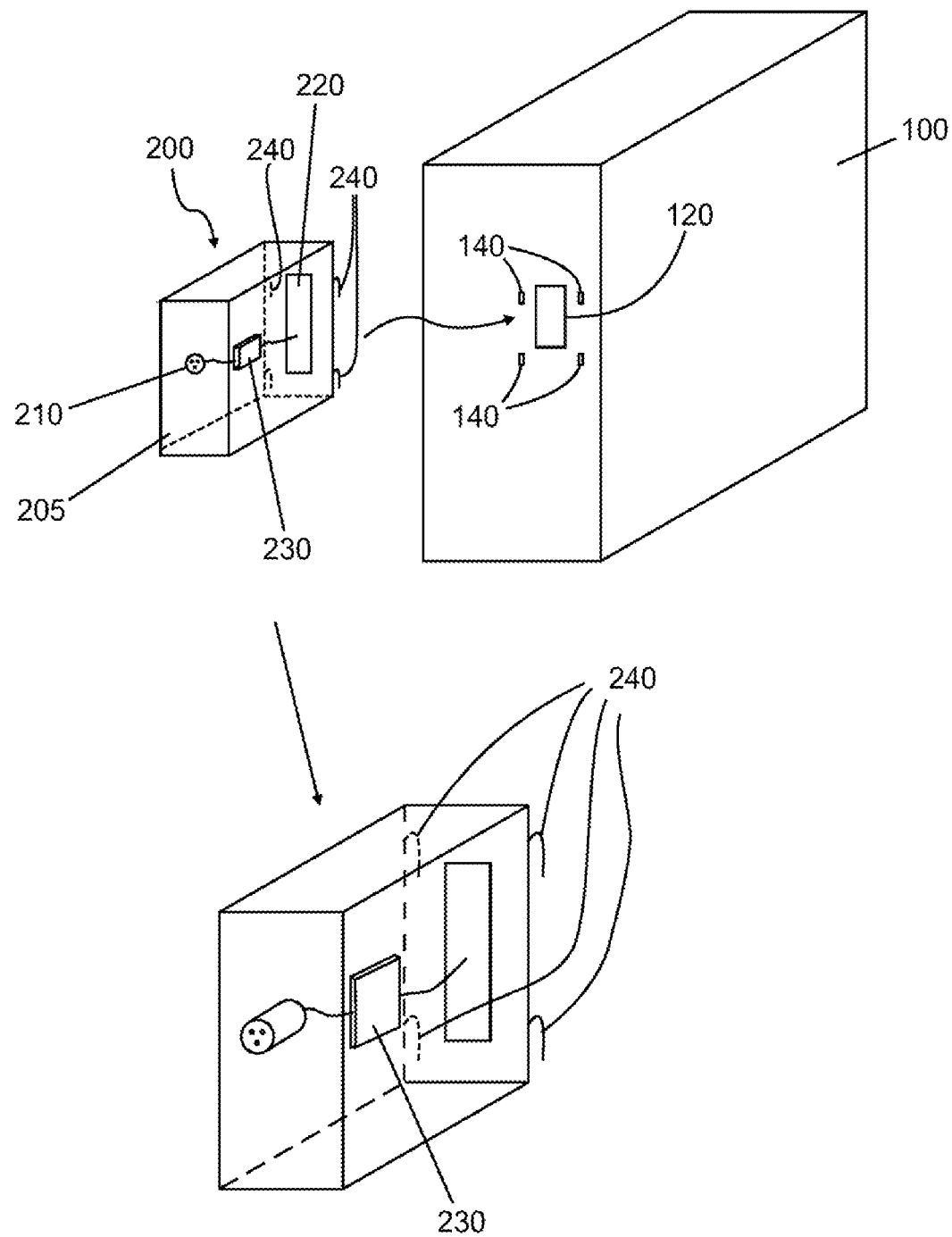

IO-LINK ADAPTER

CROSS REFERENCE TO RELATED APPLICATIONS

Applicant claims priority under 35 U.S.C. § 119 of German Application No. 10 2014 118 172.7 filed on Dec. 8, 2014, the disclosure of which is incorporated by reference.

The invention relates to an IO-Link adapter for connecting a field device to a master unit having an IO-Link interface, a field device interface and a circuit arrangement for converting the field device interface data into IO-Link interface data.

The present invention understands a field device interface to be an interface provided in the IO-Link adapter, said interface being adapted to an interface provided in the field device. The present invention understands an IO-Link interface to be an interface provided in the IO-Link adapter, said interface being adapted to an IO-Link connection. The present invention understands field device interface data to be data, which are transmitted from the interface provided in the field device to the field device interface of the IO-Link adapter. The present invention understands IO-Link interface data to be data, which are transmitted via the IO-Link interface as IO-Link data.

PRIOR ART

The use of an IO-Link for connecting field devices emerges from DE 10 2012 014 681 A1. Herein, one or a plurality of the following field devices can be connected to the master unit:
Drives and frequency converters,
Displays and operating devices (HMI),
Image recognition systems,
Power supplies,
Door safety switches,
Safety-related light processes.

An IO-Link is an intelligent sensor/actuator interface. IO-Link should be standardised as an international open standard in the standard IEC61131-9. An IO-Link is a serial point-to-point connection for the signal transfer between, for example, sensors and actuators and the IO-level of a machine. Essentially, an IO-Link transfers data between an IO-Link master and a connected IO-Link device as a slave. Both field bus modules and also SPS interface units are available as IO-Link masters. IO-Link connections are downwardly compatible with binary standard sensors and consistently use unshielded three- or five-wire standard cables.

The use of an IO-Link for connecting so-called IO-Link devices became known from DE 10 2009 013 303 A1. These are sensors and actuators known per se.

In addition to sensors and actuators, as has already been mentioned above, power supply units are, for example, also coupled to a master unit via IO-Link connections.

Many commonly used power supply units, however, have no IO-Link interfaces and are thus coupled in a conventional manner known per se.

DISCLOSURE OF THE INVENTION

Advantages of the Invention

The IO-Link adapter according to the invention enables conventional field devices to be coupled to a master unit via IO-Link connections. For this purpose, provision is made, according to the invention, for the IO-Link adapter to have fastening elements for detachably fastening to the field device, wherein by way of fastening the IO-Link adapter to the field device, coupling of the field device interface of the IO-Link adapter to an interface of the field device simultaneously takes place. By fastening the IO-Link adapter used as an additional device and component to the field device, it is thereby possible to convert the data of the conventional interface into the IO-Link compatible data and read it via the IO-Link interface.

By way of the measures mentioned in the dependent claims, advantageous developments and improvements of the IO-Link adapter indicated in the independent claim are possible.

An advantageous embodiment thus makes provision for the fastening elements to be snap-in elements. The IO-Link adapter can thereby be detachably fastened very quickly to the field device. A precise arrangement of the IO-Link adapter is also possible by way of these snap-in elements so that a secure communication between the data of the interface of the field device and the field device interface of the IO-Link adapter is ensured.

In this regard, an advantageous embodiment makes provision for the field device interface to be an opto-electronic interface. This enables a galvanic decoupling of the data transfer in a very advantageous manner. One embodiment makes provision for the data communication to take place via the opto-electronic interface in the infrared range.

A wide variety of field devices can, purely in principle, be connected. One advantageous embodiment makes provision for the field device to be a power supply. The very coupling of power supplies to a master unit has many advantages.

It is thus advantageously provided that process data of the power supply, in particular the current and the voltage, are transferred via the IO-Link interface. Diagnostic data of the power supply, in particular the temperature thereof, the operating hours, boost counter as well as very generally data characterising the status of the power supply can, however, also be transferred via the IO-Link interface. This enables the parametrising and monitoring of individual or entire system functions. By way of the transfer of data characterising the status of the power supply, also designated as so-called heartbeat parameters, via the IO-Link interface, also designated hereinafter as IO-Link for short, it is possible to monitor the status of the power supply in the installed state via the control system and automatically initiate maintenance measures.

A further embodiment also makes provision for control signals, in particular for voltage regulation and current limitation of the power supply, to be transferable via the IO-Link interface.

SHORT DESCRIPTION OF THE DRAWINGS

Exemplary embodiments of the invention are depicted in the drawing and are described further in the description below.

An IO-Link adapter according to the invention and a field device in the form of a power supply, onto which this IO-Link adapter can be locked in place/snapped into place, are schematically depicted in the FIGURE.

EMBODIMENTS OF THE INVENTION

An IO-Link adapter, designated as a whole with 200, for connecting to a field device, in the present case a power supply 100, has a housing 205, on the front side thereof a plug connection 210 is provided for connecting a conventional cable for an IO-Link connection. The plug connection 210 serves for coupling of a three- or five-wire standard cable. A plug connection 210 for a three-wire standard cable is depicted in the FIGURE.

A circuit arrangement 230 is provided in the housing itself, which is depicted in a transparent manner, said circuit arrangement being connected to the plug connection 210 and also to an opto-electronic, in particular infrared interface 220. The circuit arrangement 230 converts the data received via the infrared interface 220 into IO-Link data, which are output via the plug connection 210. Locking hooks 240 are also depicted on the rear side of the housing 205, for which corresponding counter snap-in elements 140 are provided in the housing 100. These locking hooks 240 serve for the detachable fastening of the IO-Link adapter 200 in a front side of the housing of the power supply 100 by locking in place. The locking hooks 240 are, in this regard, arranged such that the opto-electronic interface 220 coincides exactly with an opto-electronic interface 120 in the power supply 100 and such that data can be bidirectionally transferred in an opto-electronic manner, i.e. in the infrared range. These data are, for example, process data of the power supply 100, in particular the current and the voltage. They can, however, also be diagnostic data, in particular the temperature, the operating hours, boost counter as well as data characterising the status of the power supply. These data characterising the status of the power supply are also designated as heartbeat parameters and enable the status of the power supply 100 to be monitored via an external control system and maintenance measures to be automatically initiated. The diagnostic data transferred via the infrared interfaces 120, 220 and the IO-Link plug connection enables a constant monitoring of the power supply 100. Parametrising and monitoring of individual or entire system functions can thereby be carried out.

It is also possible to transfer data, which enable voltage regulation or current limitation and remote boost of the power supply.

The advantage of the IO-Link adapter is that it is upgradable to a certain extent and can also be used with power supplies known per se, which already have, for example the infrared interface 120. In this case, only fastening elements for the IO-Link adapter 200 have to be provided, i.e. for example the snap-in elements 240, 140 or also other fastening elements, for example screws.

The invention claimed is:

1. An IO-Link adapter for connecting a field device to a master unit, IO-Link adapter having an IO-Link interface, a field device interface and a circuit arrangement for converting the field device interface data into IO-Link interface data,
   wherein the IO-Link adapter has fastening elements for detachably fastening to the field device, and
   wherein by fastening the IO-Link adapter to the field device using the fastening elements:
      coupling of the field device interface of the IO-Link adapter to an interface of the field device simultaneously takes place,
      the field device interface data is converted into the IO-Link interface data, and
      the IO-Link interface data is read via the IO-Link interface.

2. The IO-Link adapter according to claim 1, wherein the fastening elements are snap-in elements.

3. The IO-Link adapter according to claim 1, wherein the field device interface is an opto-electronic interface.

4. The IO-Link adapter according to claim 3, wherein the data communication takes place via the opto-electronic interface in the infrared range.

5. The IO-Link adapter according to claim 1, wherein the field device is a power supply.

6. The IO-Link adapter according to claim 5, wherein process data of the power supply, in particular the current and the voltage, are transferred via the IO-Link interface.

7. The IO-Link adapter according to claim 5, wherein diagnostic data, in particular the temperature, the operating hours, boost counter, DC alarm as well as data characterizing the status of the power supply are transferred via the IO-Link interface.

8. The IO-Link adapter according to claim 1, wherein switching signals for switching off the field device are transferable via the IO-Link interface.

9. The IO-Link adapter according to claim 5, wherein control signals, in particular for voltage regulation and current limitation of the power supply, are transferable via the IO-Link interface.

* * * * *